Sept. 15, 1959  G. D. HUNTER  2,904,119

EARTH WORKING TOOL MOUNTING MEANS

Filed March 16, 1955

*INVENTOR.*
GEORGE D. HUNTER
BY
ATTORNEYS

United States Patent Office 2,904,119
Patented Sept. 15, 1959

2,904,119

EARTH WORKING TOOL MOUNTING MEANS

George D. Hunter, Des Moines, Iowa, assignor, by mesne assignments, to Deere & Company, a corporation of Delaware Application March 16, 1955, Serial No. 494,664

2 Claims. (Cl. 172—762)

The present invention relates generally to agricultural machines and more particularly to machines having soil-entering means so constructed and arranged to open a furrow beneath the surface of the ground, such as for the purpose of providing for the injection into the soil of fluids for fertilizing and/or other purposes.

The object and general nature of the present invention is the provision of a tool particularly constructed and arranged to be drawn through the ground below the surface so as to form a furrow, particularly one into which fertilizing fluids, such as anhydrous ammonia or other fluid, may readily be introduced.

Still further, it is a feature of this invention to provide a furrow-forming tool or implement in which the tool-supporting shank and the tool itself are interconnected so as to be attached and detached readily and quickly, when necessary. More specifically, it is a feature of this invention to provide a shank and tool combination in which the tool, which may be in the form of a casting made of especially hard iron or the like, carries a lug that is adapted to enter a recess in the forward edge at the lower end of the shank, with readily attachable means for holding the tool in position on the shank, which means lies substantially wholly within openings formed in the tool so as to be protected thereby from contact with the soil as the tool is drawn through the ground.

These and other objects and advantages of the present invention will be apparent to those skilled in the art after a consideration of the following detailed description, taken in conjunction with the accompanying drawings in which.

Figure 1:
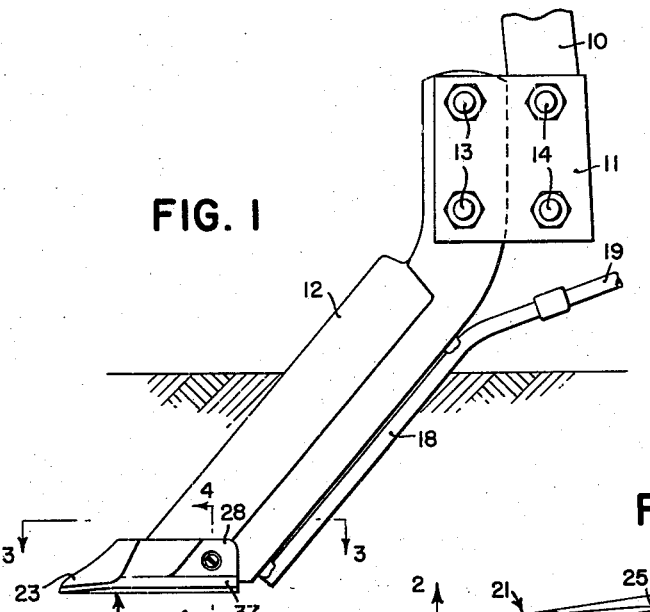
Fig. 1 is a side view of a portion of an agricultural implement in which the principles of the present invention have been incorporated.
Figure 3:
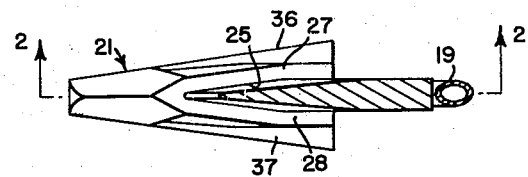
Fig. 3 is a sectional view taken along the line 3—3 of Fig. 1.

The principles of the present invention have been shown as incorporated in a farm machine adapted to be drawn on the ground by a conventional farm tractor (not shown), the machine being particularly adapted to apply liquid anhydrous ammonia to the soil by injecting the same into furrows formed underneath the surface of the ground. As illustrated, the implement includes a plurality of tool standards 10, only one of which is shown in the drawings, that carry a pair of bracket plates 11 by which the upper end of a generally downwardly and forwardly extending knife shank 12 is connected, the upper portion of the knife shank being apertured to receive bolts 13, and the standard 10 and plates 11 being apertured to receive a similar pair of bolts 14 that fix the plates to the standard 10. The knife shank 12 extends downwardly and forwardly and at its lower end is provided with a forwardly facing notch 16. The lower edge of the shank 12 has a toe portion 17, and rearwardly thereof the lower edge of the shank 12 lies slightly above the lowermost edge portion of the toe 17. Secured to the back edge of the shank 12 is a tube 18 having an opening at its lower end and to which liquid anhydrous ammonia is delivered, as through a supply tube 19. The tube 18 preferably is welded to the rear edge of the shank 12.

Figure 2:
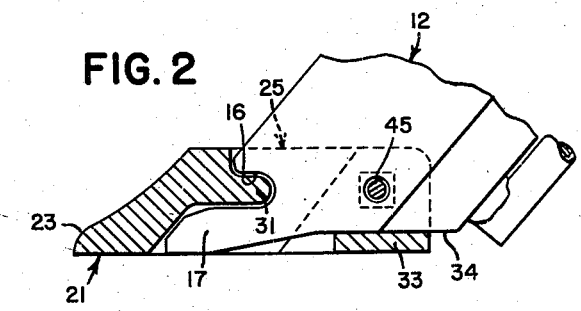
Fig. 2 is an enlarged fragmentary side view, with parts being shown in section, of the principal soil-entering portion of the tool shown in Fig. 1, Fig. 2 being a generally sectional view taken along the line 2—2 of Fig. 3.

Secured to the lower end of the shank 12 is a furrow-forming tool or point member 21, preferably constructed as a casting requiring no machining and made of a very hard metal, such as white iron that is extremely resistant to abrasion. The tool or point member 21 has a forward point section 23 adapted to be forced through the soil and rearwardly of the section 23 the tool has a generally vertical slot 25 open rearwardly and forming a rear bifurcated section having two laterally spaced apart side wall portions 27 and 28. At the forward portion of the slot 25, the tool 21 is provided with a rearwardly extending lug 31 formed as a part that extends integrally from one side to the other of the slot, thus interconnecting the forward portions of the side wall sections 27 and 28. The lug 31 is dimensioned to enter the notch 16 in the tool portion of the shank 12 by a rocking and/or generally rearward shifting movement of the tool 21 relative to the shank 12. At the lower rear portion of the tool 21, the side walls 27 and 28 are interconnected by a transverse wall means 33 that lies, when the tool 21 is attached to the shank 12, underneath a slightly elevated lower edge portion, shown at 34, of the shank 12, the slot 25 being open forward of the wall means 33 to the toe portion 23, as shown in Fig. 2. The sides of the tool 21, including the wall sections 27 and 28, are so formed as to provide rearwardly diverging flanges 36 and 37 that are adapted, when the tool is drawn through the ground, to form laterally opening spaces in the furrow.

Figure 4:
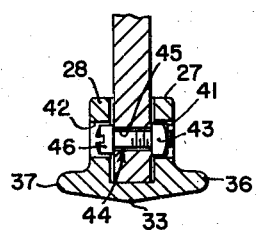
Fig. 4 is a sectional view taken along the line 4—4 of Fig. 1.

The side walls 27 and 28, adjacent their rear ends, are formed with apertures 41 and 42. The aperture 41 is square and is adapted to non-rotatably receive the nut member 43 of bolt means 44 that extends through an opening 45 formed in the lower portion of the shank 12. The head 46 of the bolt means 44 preferably is round and is disposed rotatably within the opening 42, the head being provided with a kerf. As will be seen from Fig. 4, the nut 43 and head 46 are disposed wholly within the apertures 41 and 42 so that during operation the bolt means 44 does not come into contact with the soil, yet when the bolt is tightened, the tool 21 is rigidly connected with the lower end of the shank 12. In attaching the tool to the shank the lug 31 is first passed into the notch 16, and then the side wall portions 27 and 28 are swung up toward the shank until the openings 41 and 42 are aligned with the opening 45 in the shank, whereupon the bolt means 44 may then be inserted.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. For use with a soil-penetrating shank having a notch in the lower portion of the forward edge of said shank, the improvement comprising a furrow-forming tool adapted to be connected to the lower end of said shank, said tool having a slot opening from above and below and to the rear that is adapted to receive the lower end of said shank, a lug at the forward portion of said slot extending rearwardly into said slot so as to be adapted to enter the notch in the forward edge of said shank, the lower portion of said tool being widened in a rearwardly diverging manner forming at the rear lower portion of the tool a pair of generally laterally outwardly extending flanges, and wall means extending across the lower rear portion of said slot from one side to the other of said tool adapted for abutment of the lower end of the shank, the lower face of said wall means being substantially flush with the lower face of the forward portion of said tool, and portions on the rear portion of said shank at the lower end thereof and the adjacent rear portions of said tool having horizontal openings brought into alignment by shifting the tool relative to said shank so that the lug is seated in the notch and the lower end of the shank is abutting the wall means; and locking means passing through the aligned openings and connecting said tool to said shank.

2. The invention defined in claim 1, in which the locking means is in the form of bolt means and is further characterized by the openings in the side of said tool being shaped so that both the head and nut of said bolt means are disposed within said openings.

References Cited in the file of this patent

UNITED STATES PATENTS

| | | |
|---|---|---|
| 64,657 | Friberg | May 14, 1867 |
| 245,530 | Martz | Aug. 9, 1881 |
| 247,148 | Anderson | Sept. 20, 1881 |
| 419,935 | Fox | Jan. 21, 1890 |
| 465,422 | Barton | Dec. 15, 1891 |
| 623,645 | Young | Apr. 25, 1899 |
| 924,583 | Rosencranz | June 8, 1909 |
| 935,147 | Gardner | Sept. 28, 1909 |
| 1,073,984 | Hartig | Sept. 23, 1913 |
| 1,130,655 | Andrew et al. | Mar. 2, 1915 |
| 1,520,079 | Perdue | Dec. 23, 1924 |
| 1,661,692 | Everist | Mar. 6, 1928 |
| 1,742,052 | Anderson | Dec. 31, 1929 |
| 2,713,299 | Shager et al. | July 19, 1955 |
| 2,842,077 | Morrison | July 8, 1958 |